United States Patent [19]
Gutierrez et al.

[11] Patent Number: 5,926,367
[45] Date of Patent: Jul. 20, 1999

[54] METHOD AND APPARATUS FOR THE THERMAL MANAGEMENT OF ELECTRONIC DEVICES

[75] Inventors: Paul A. Gutierrez; Thomas T. Holden, both of Tumwater, Wash.

[73] Assignee: Intel Corporation, Santa Clara, Calif.

[21] Appl. No.: 08/987,427

[22] Filed: Dec. 9, 1997

[51] Int. Cl.[6] .................................................. H05K 7/20
[52] U.S. Cl. ......................... 361/695; 361/715; 361/707
[58] Field of Search .................... 307/150; 361/686–688, 361/690, 694–695, 704, 707, 715

[56] References Cited

U.S. PATENT DOCUMENTS

| 3,962,608 | 6/1976 | Forster et al. | 361/695 |
| 4,084,250 | 4/1978 | Albertine et al. | 361/686 |

FOREIGN PATENT DOCUMENTS

| 8099821 | 6/1983 | Japan | 361/695 |
| 3251817 | 10/1988 | Japan | 361/695 |
| 6021677 | 1/1994 | Japan | 361/695 |
| 6077677 | 3/1994 | Japan | 361/697 |

*Primary Examiner*—Gregory Thompson
*Attorney, Agent, or Firm*—Blakely, Sokoloff, Taylor & Zafman

[57] ABSTRACT

An apparatus comprising an enclosure, a power supply circuit and a passive heat removal device is described. Specifically, the enclosure having a plurality of sides defines an air plenum wherein select ones of the plurality of sides have openings disposed therein with a fan disposed within a first of the openings. The power supply circuit, disposed within the enclosure, is operative to provide power to electronic components disposed outside of the enclosure, and to dissipate heat into the air plenum. The passive heat removal device, disposed along a first of said plurality of sides, is operative to transfer heat generated by one or more electronic devices thermally coupled to the outside of the enclosure into the air plenum for evacuation by the fan.

19 Claims, 3 Drawing Sheets

METHOD AND APPARATUS FOR THE THERMAL MANAGEMENT OF ELECTRONIC DEVICES

BACKGROUND OF THE INVENTION

1. Field of the Invention

The present invention generally pertains to the field of electronic devices and, in particular, to a method and apparatus for the thermal management of electronic devices.

2. Background Information

It is known that electronic devices dissipate heat during operation. More specifically, the electronic components comprising electronic devices dissipate heat. Thermal management, i.e., the ability to keep temperature sensitive elements within the electronic device within a prescribed operating temperature, has evolved to address the increased temperatures created within such electronic devices as a result of increased processing speed/power of the internal electronic components. Historically, electronic devices were cooled by a natural convection thermal management technique. That is, the cases or packaging of these prior art electronic devices were designed with openings (e.g., slots) strategically located to allow warm air to escape and cooler air to be drawn in.

However, with the advent of high performance processors such as, for example, the Intel Pentium® Pro processor, have required more innovative thermal management. For example, in the last several years processing speeds of computer systems have climbed from 25 MHz to over 233 MHz. Similarly, smaller hand-held devices such as, for example, personal digital assistants (PDA) have also benefited from improved processor technology with ever increasing processing speeds and power. Each of these increases in processing speed and power generally carry with it a "cost" of increased heat dissipation. Corresponding improvements in thermal management technology accompanied, out of necessity, such technological improvements. Simple convection, no longer sufficient to provide proper thermal management, was either supplanted or assisted by forced air thermal management techniques and the addition of passive heat dissipating devices, e.g., heat sinks, to temperature sensitive devices. For example, some prior art computer systems have resorted to thermally coupling a heat sink to the "heat slug" or "thermal plate" (e.g., top cover) of the processor in an effort to remove the heat from the temperature sensitive core of the processor, wherein a system fan is responsible for remove the heated air from within the system chassis. Indeed, some of these new high speed systems require multiple fans, some of which are dedicated to individual processor(s) with a dedicated heat sink to maintain proper operating temperatures.

Those skilled in the art will appreciate, however, that the additional fans and heat sinks necessary for prior art forced air cooling systems result not only in an added expense for manufacturers of such electronic devices, but they are often bulky and require an inordinate amount of real estate within the electronic device. Fans have notoriously poor reliability problems, and thus will fail after years of prolonged use well before other components of the electronic device. Further, the additional fans increase the acoustic and electrical "noise" of the electronic device, as well as increasing the likelihood of a reliability failure of the electronic device. Another shortcoming of prior art forced air thermal management solutions is that although operating temperatures within an electronic device may fluctuate during operation, many of the forced air cooling systems of the prior art merely have two modes of operation: on and off. Those skilled in the art will appreciate that such use generally results in premature wearing of the fan bearings, resulting in an increase in acoustical noise. With an effort by most in the industry to reduce the size of electronic devices while increasing their reliability, the increased cost and space requirements necessitated by multiple fans is not an attractive thermal management solution.

Thus a need exists for a method and apparatus for the thermal management of electronic devices that is unencumbered with the deficiencies and limitations inherent in the prior art.

SUMMARY OF THE INVENTION

Briefly, in accordance with the teachings of the present invention, a method and apparatus for the thermal management of electronic devices is disclosed. In one embodiment, an apparatus comprising an enclosure, a power supply circuit and a passive heat removal device is described. Specifically, the enclosure having a plurality of sides defines an air plenum wherein select ones of the plurality of sides have openings disposed therein with a fan disposed within a first of the openings. The power supply circuit, disposed within the enclosure, is operative to provide power to electronic components disposed outside of the enclosure, and to dissipate heat into the air plenum. The passive heat removal device, disposed along a first of said plurality of sides, is operative to transfer heat generated by one or more electronic devices thermally coupled to the outside of the enclosure into the air plenum for evacuation by the fan.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
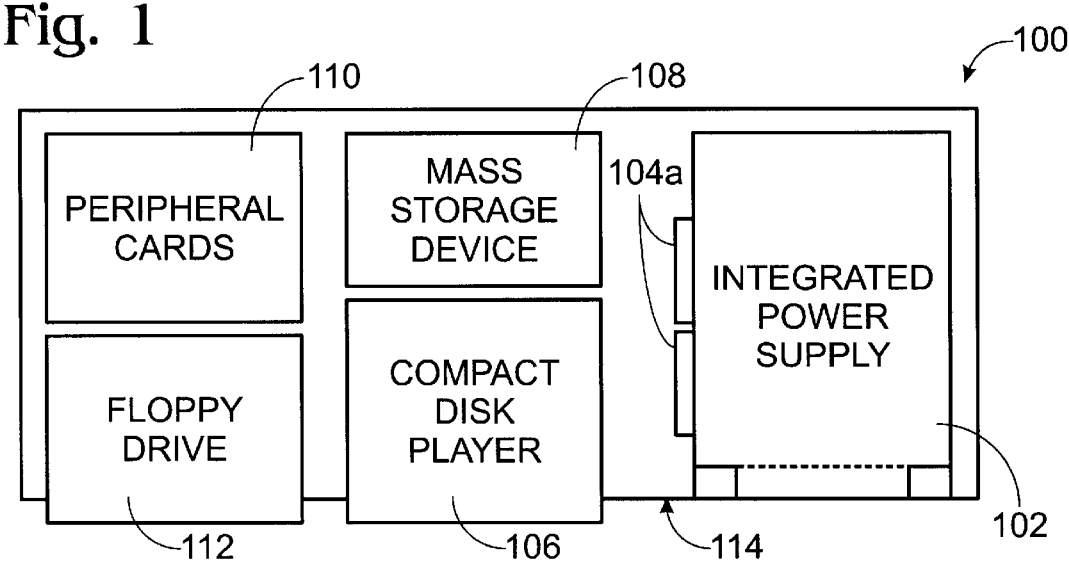
FIG. 1 illustrates a top view of a computer system with the cover removed to expose the elements within the computer system, including one example of an integrated power supply incorporating the teachings of the present invention.

Referring now to FIG. 1, a block diagram illustrating one embodiment of an electronic device, e.g., computer system 100, incorporating the innovative thermal management system provided by integrated power supply 102 is shown. In the example embodiment of FIG. 1, computer system 100 is shown comprising integrated power supply 102 incorporated with the teachings of the present invention, processors 104a through 104n, compact disk player 106, mass storage device 108, peripheral cards 110 and disk drive 112, each of which housed within chassis 114. Processors 104a through 104n may be coupled to integrated power supply 102 through the "heat slug" or "thermal plate" of the processors in any of a number of alternate methods known in the art and, thus, need not be further described here.

As will be described in greater detail below with respect to FIGS. 2, 3 and 4 integrated power supply 102 provides a centralized thermal management solution for a host electronic device, e.g., computer system 100, by congregating the largest heat dissipating devices around the power supply, conducting the heat generated by these devices into an air plenum formed within the enclosure of the power supply and evacuating the heat produced with the use of a single fan. As will be shown in greater detail below, in accordance with the teachings of the present invention, the enclosure of integrated power supply 102 incorporates a heat sink assembly, wherein a flat base of the heat sink assembly is provided as an outer surface of integrated power supply 102, and the heat dissipating fins of the heat sink assembly protrude from the flat base into the air plenum. Thus, in accordance with one embodiment of the present invention, when processors 104a through 104n are thermally coupled to the flat base of the heat sink forming substantially one external surface of integrated power supply 102, the heat produced by processors 104a through 104n is conducted to the heat dissipating fins within the air plenum, and evacuated out of the power supply with a single fan coupled to the front end of the power supply. Accordingly, as will be detailed below, the introduction of integrated power supply 102 provides an efficient and cost effective thermal management solution to a variety of electronic devices including, but not limited to, computer system 100.

Figure 2:
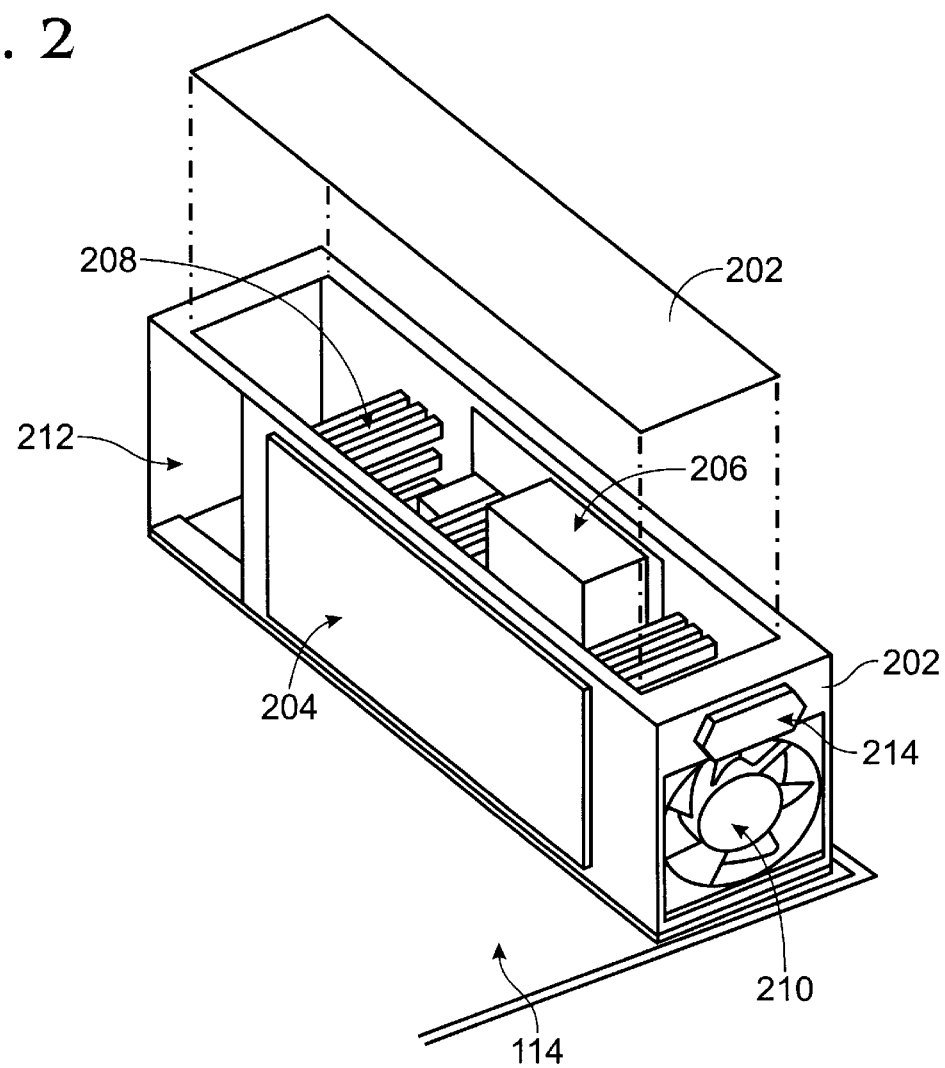
FIG. 2 is an assembled view of one example of an integrated power supply with the top surface removed to expose the internal elements of the integrated power supply, in accordance with one embodiment of the present invention.

Having introduced, in the context of FIG. 1, an example environment, e.g., computer system 100, within which to practice the present invention, FIG. 2 provides an assembly view of an integrated power supply 200 incorporating the teachings of the present invention. As depicted in the illustrated example embodiment of FIG. 2, integrated power supply 200 is depicted with the top surface of the enclosure removed to expose the internal configuration of integrated power supply 200. In one embodiment, integrated power supply 200 is beneficially introduced into the example computer system 100 of FIG. 1 as integrated power supply 102.

As depicted in the example embodiment of FIG. 2, integrated power supply 200 is shown within electronic device chassis 114 comprising enclosure 202, heat sink assembly defined by flat base 204 and a plurality of heat dissipating fins cumulatively referenced as 208, power supply components cumulatively referenced as 206, air intake 212, power input 214 and fan 210.

Those skilled in the art will appreciate that the location of elements within integrated power supply 200 is merely a design choice, and the many elements within integrated power supply 200 may be beneficially reoriented in order to accommodate the specific needs of a particular application. Similarly, although flat base 204 of the heat sink protrudes slightly from the side wall of enclosure 202 in the illustrated embodiment of FIG. 2, those skilled in the art will recognize that flat base 204 of the heat sink may be flush with the side wall of enclosure without departing from the spirit and scope of the present invention.

Figure 3:
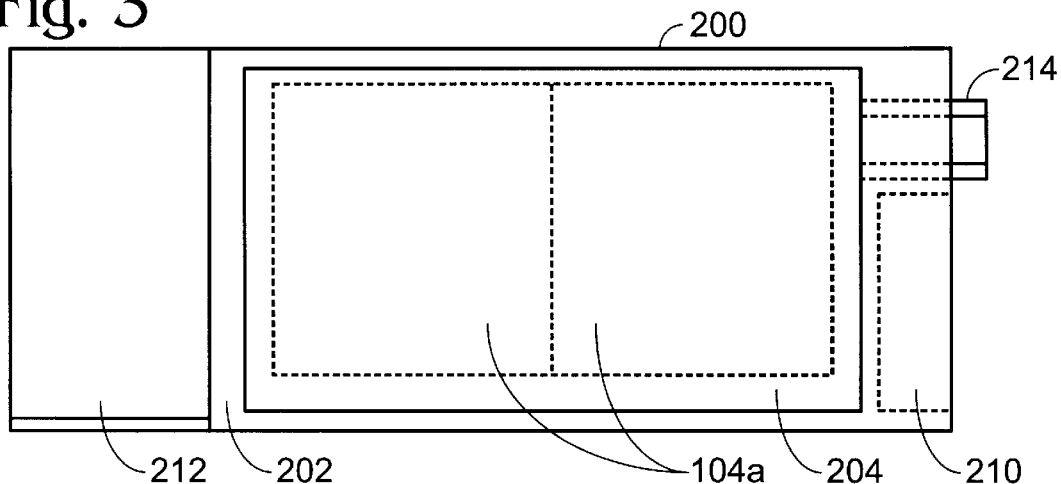
FIG. 3 is a side view of the integrated power supply of FIG. 2, in accordance with one embodiment of the present invention.

Turning now to FIG. 3, a side view of integrated power supply 200 is presented to further describe the relationship between the individual elements of integrated power supply 200. In particular, the side view of FIG. 3 depicts the relationship between air intake 212, power supply enclosure 202, flat base 204 of the heat sink and power input 214. In addition, represented by dashed lines, the location on flat base 204 for receiving processors 104a through 104n is depicted, as well as the location of fan 210 within integrated power supply 200.

Figure 4:
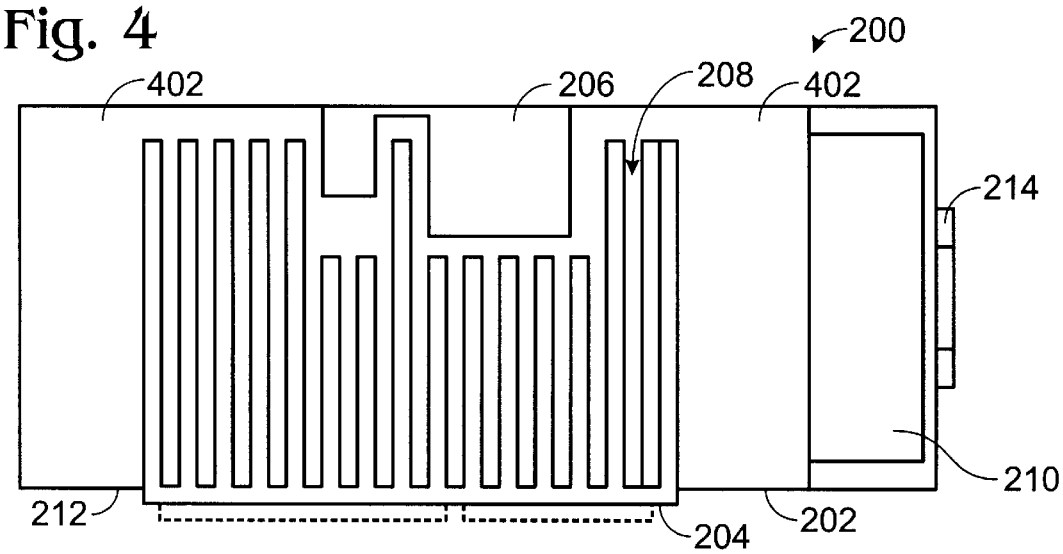
FIG. 4 is a top view of the integrated power supply of FIG. 2, in accordance with one example embodiment of the present invention.

FIG. 4 is a top view of integrated power supply 200, depicted with the top cover of enclosure 202 removed to expose air plenum 402 defined by enclosure 202 and the internal elements of integrated power supply 200. In particular, FIG. 4 illustrates one example of the interrelationship between heat dissipating fins 208, enclosure 202, power supply components 206 and fan 210. As illustrated in FIG. 4, air is drawn into air plenum 402 through air intake 212 by fan 210. The air passes through protruding fins 208 of the heat sink and around power supply components 206 as it is pulled, in one embodiment, from air intake 212 through fan 210 to the immediate surroundings of a host electronic device. Thus, in accordance with the teachings of the present invention, processors 104a through 104n (depicted with dashed lines) thermally coupled to flat base 204 of the heat sink dissipate the heat generated during normal operation into air plenum 402 defined by power supply enclosure 202, protruding fins 208 and power supply components 206.

Those skilled in the art will appreciate that the innovative design of integrated power supply 200 offers many advantages over prior art thermal management systems. First, this physical arrangement transforms system thermal management into a much simpler task by allowing a single fan (e.g., fan 210) to provide the air flow necessary to cool temperature sensitive elements within the system. Further, by reducing the number of fans required for the thermal management of the system, the reliability of the system is correspondingly improved. Similarly, fewer fans generate less noise, both acoustic and electric. In addition, the innovative design of integrated power supply 200 allows the power supply case, e.g., enclosure 202, to provide the necessary mechanical support for processors 104a through 104n and their heat sinks, rather than the printed circuit board assembly of prior art solutions.

Although, in accordance with the example embodiment of FIGS. 2 through 4, air flow passes from air intake 212 through fan 210 as air is pulled from within the host electronic device to the outside air, those skilled in the art will appreciate that, in an alternate embodiment, the direction of the fan could be reversed, blowing air into integrated power supply 102 and the host electronic device. Such artisans may well recognize, however, that such an approach has the drawback of drawing dust and other particulate into the machine which, if allowed to build up, could result in a failure of the electronic device. Further, those skilled in the art may appreciate that it is less efficient to force air (e.g., push air) through the air plenum than it is to pull air from the electronic device and through integrated power supply 102. Nevertheless, these and other alternate embodiments are nonetheless within the spirit and scope of the present invention.

As alluded to above, during the course of operation many electronic devices experience temperature fluctuations. Many of the prior art thermal management systems did not account for such temperature fluctuations, resulting in an inefficient thermal management system. The thermal management solution of integrated power supply 200, however, includes an air flow control system, an example of which is depicted in the block diagram of FIG. 5. As will be detailed below, air flow control circuit 500 is designed to improve the efficiency of integrated power supply 200 by regulating the speed of fan 210 to correspond with the monitored temperature within integrated power supply 200.

Figure 5:
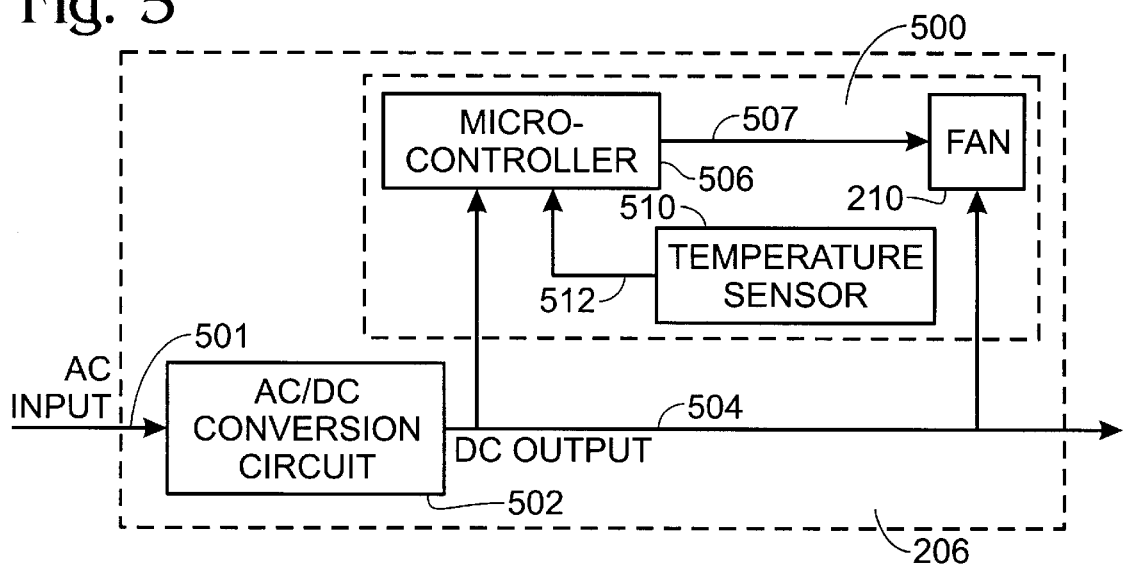
FIG. 5 is a block diagram of an example air flow control circuit suitable for use within the example integrated power supply of FIG. 2.

In the illustrated example embodiment of FIG. 5, air flow control circuit 500 is depicted as embedded within power supply circuitry 206. As illustrated in FIG. 5, power supply circuit 206 is shown comprising air flow control circuit 500 including microcontroller 506, temperature sensor 510 and fan 210. In addition, power supply circuit 206 is shown comprising the power regulation circuitry referenced as alternating current (AC) to direct current (DC) conversion circuitry 502, which takes an AC input 501 and provides a DC output 504 for the host electronic device.

In accordance with the embodiment depicted in FIG. 5, microcontroller 506 of air flow control circuit 500 monitors the temperature within air plenum 402 via temperature sensor 510. In accordance with the illustrated example embodiment, temperature sensor 510 is centrally located between the protruding heat sink fins 208 emanating from power supply circuit 206. Those skilled in the art will appreciate that such placement provides an indication of processor activity as well as an average air plenum temperature, however, alternate locations for temperature sensor 510 are anticipated. As microcontroller 506 determines that air plenum temperature is increasing, microcontroller 506 correspondingly increases the speed of fan 210 via line 507, thereby increasing the air flow within air plenum 402. Alternatively, as microcontroller 506 determines that the temperature within air plenum 402 is dropping, microcontroller 506 correspondingly decreases the speed of fan 210 via line 507, thereby reducing the air flow within air plenum 402 and reducing the amount of energy spent to cool devices which are already sufficiently cool.

Figure 6:
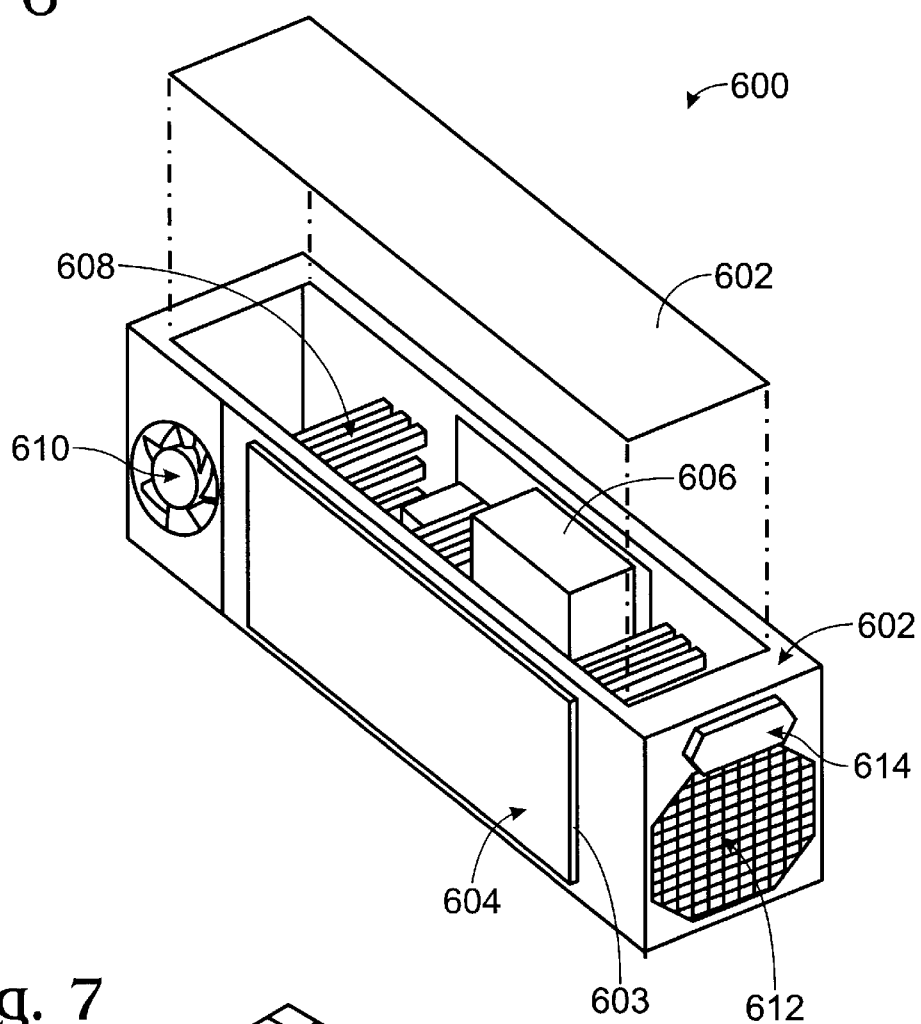
FIG. 6 is an assembly view of an alternate example embodiment of an integrated power supply, incorporating the teachings of the present invention.

Turning next to FIG. 6, an assembly view of another alternate embodiment of an integrated power supply with the top surface removed to expose the internal configuration of integrated power supply 600. In the illustrated example embodiment of FIG. 6, integrated power supply 600 is depicted comprising essentially the same elements as integrated power supply 200, albeit configured in an alternate embodiment. In particular, integrated power supply 600 is depicted comprising enclosure 602, heat sink assembly 603 having a flat base 604 and protruding heat dissipating fins 608, power supply circuitry 606, opening 612 covered with a wire mesh, power adapter 614 and fan 610. In one embodiment, the air flow control circuitry presented above with reference to FIG. 5 is beneficially incorporated into integrated power supply 600.

In accordance with the illustrated example embodiment of FIG. 6, in operation fan 610 draws air in from a host electronic device and forces the exhaust down the air plenum and through heat sink fins 608 to opening 612 where it exits the power supply. Accordingly, when heat generating components of the host electronic device are thermally coupled to flat base 604 of heat sink assembly 603, the heat generated by the components is conducted into the air plenum via heat sink fins 608 for evacuation via opening 612.

Figure 7:
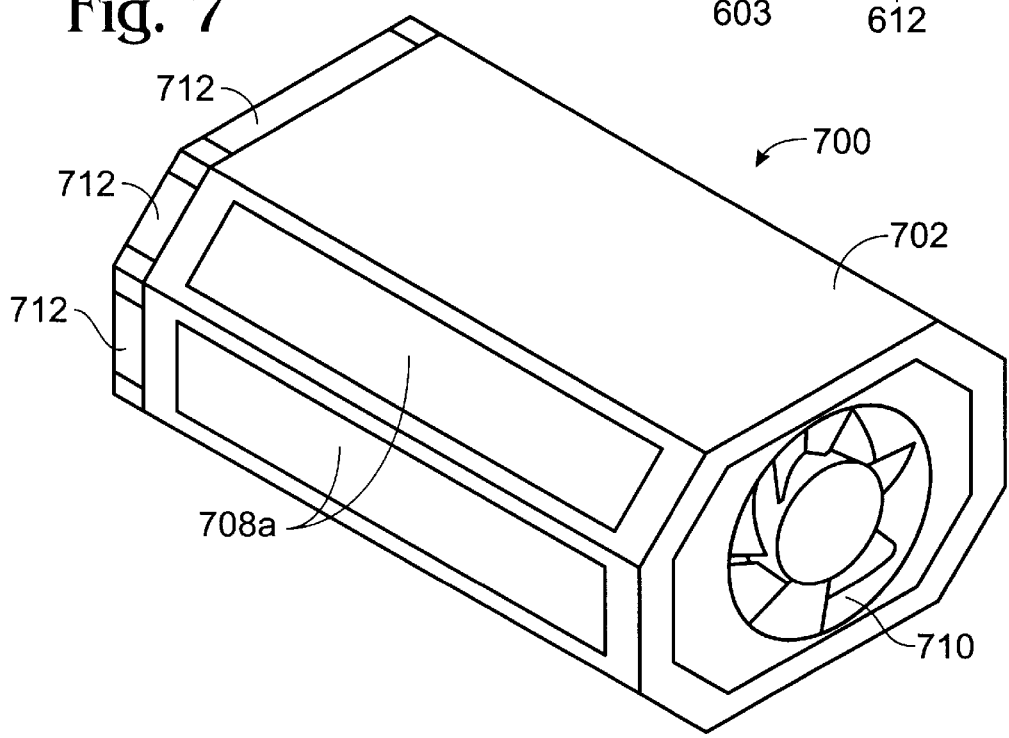
FIG. 7 is an assembly view of another alternate example embodiment of an integrated power supply, incorporating the teachings of the present invention.

Turning next to FIG. 7, another alternate embodiment of an integrated power supply 700 incorporating the teachings of the present invention is depicted. In particular, in accordance with the illustrated example embodiment of FIG. 7, integrated power supply 700 is depicted comprising enclosure 702 having a plurality of faceted sides, thereby increasing the heat conducting surface area and allowing additional components to be mounted thereto, fan 710, heat sinks 708a through 708n, air intake 712 and power input 714. The operation of integrated power supply 700 is analogous to the operation of the example embodiments described above, with the exception that additional surfaces are provided in enclosure 702 to allow additional components to be mounted to enclosure 702 for the purpose of heat dissipation. Moreover, those skilled in the art will appreciate that, so long as enclosure 702 (or similarly 202) is comprised of a heat conducting material, enclosure 702 may, itself, act as a heat sink without the additional requirement of an actual heat sink. That is, in yet another alternate embodiment, processors 104a through 104n, power transistors, and other heat producing components may well be thermally coupled to enclosure 702 (or 202) of the integrated power supply for heat dissipation via the air plenum defined by enclosure 702 (or 202).

Thus, alternative embodiments for a thermal management system and method incorporating the teachings of the present invention have been described. While the system and method of the present invention has been described in terms of the above illustrated embodiments, those skilled in the art will recognize that the invention is not limited to the embodiments described. For example, although not illustrated, those skilled in the art will appreciate that many electronic devices may well benefit from the teachings of the present invention. For example, audio components such as a receiver, a compact disk player, a digital versatile disk player and the like may well benefit from the integrated power supply of the present invention. Similarly, television/video display monitors, video cassette recorders/players and the like may also benefit from the inclusion of the integrated power supply. Further examples abound, such as medical equipment (e.g., heart rate monitor), telephony equipment (e.g., private branch exchange (PBX)) and office equipment (e.g., facsimile, photocopier, etc.) may also benefit from the integrated power supply. Thus, the present invention can be practiced with modification and alteration without departing from the spirit and scope of the appended claims. Accordingly, the foregoing descriptions thereof are to be regarded as illustrative instead of restrictive on the present invention.

What is claimed is:

1. An apparatus comprising:
   an enclosure having a plurality of sides defining an air plenum, wherein at least one of the plurality of sides have openings disposed therein, with a fan disposed within a first of said openings;
   a power supply circuit, disposed within the enclosure, to provide power to electronic components disposed outside of the enclosure; and a passive heat removal device, disposed along a first of said plurality of sides, to transfer heat generated by one or more electronic components thermally coupled to the passive heat removal device outside of the enclosure into the air plenum for evacuation by the fan.

2. The apparatus of claim 1, wherein the passive heat removal device is a thermally conductive material forming one side of the enclosure.

3. The apparatus of claim 1, wherein the fan, in cooperation with a second of said openings, evacuates heated air out of the air plenum and replaces the removed air with cooler outside air.

4. The apparatus of claim 1, wherein the passive heat removal device is a heat sink assembly having a flat base and a plurality of heat dissipating fins protruding from the flat base, wherein the flat base of the heat sink assembly substantially comprises one of the plurality of sides of the enclosure and the plurality of heat dissipating fins protrudes into the air plenum.

5. The apparatus of claim 4, wherein the one or more electronic components is thermally coupled to the flat base of the heat sink assembly, wherein heat generated by the one or more electronic components is transferred through the flat base into the air plenum via the plurality of heat dissipating fins.

6. The apparatus of claim 1, further comprising an air flow control circuit, disposed within the enclosure, operative to monitor air plenum temperature and adjust air flow within the air plenum based, at least in part, on the monitored temperature.

7. The apparatus of claim 6, wherein the air flow control circuit adjusts air flow within the air plenum by controlling the fan.

8. An apparatus comprising:
   one or more electronic components; and
   a power supply assembly, electrically coupled to the one or more electronic components, the power supply having an enclosure with a plurality of sides defining an air plenum, wherein at least one of the plurality of sides having openings disposed therein, with a fan disposed within a first of said openings, and a passive heat removal device, disposed along a first of said plurality of sides, thermally coupled to the one or more electronic components, to transfer heat generated by the one or more electronic components into the air plenum for evacuation by the fan.

9. The apparatus of claim 8, wherein the passive heat removal device is a thermally conductive material forming one side of the enclosure.

10. The apparatus of claim 8, wherein the fan, in cooperation with a second of said openings, evacuates heated air out of the air plenum and replaces the removed air with cooler outside air.

11. The apparatus of claim 8, further comprising an air flow control circuit, disposed within the enclosure, operative to monitor air plenum temperature and to adjust air flow within the air plenum based, at least in part, on the monitored temperature.

12. The apparatus of claim 11, wherein the air flow control circuit adjusts air flow within the air plenum by adjusting fan speed.

13. A thermal management method comprising:
   (a) integrating a passive heat removal device with a power supply chassis, the power supply chassis having a plurality of sides, a first of which including the passive heat removal device, wherein the plurality of sides define an air plenum with at least one of the plurality of sides having openings disposed therein, with a fan disposed within a first of the openings; and
   (b) thermally coupling one or more electronic components to the passive heat removal device outside of the power supply chassis, wherein heat generated by the one or more electronic components is transferred from the passive heat removal device into the air plenum for evacuation by the fan.

14. The thermal management method of claim 13, further comprising:
   (c) monitoring air plenum temperature; and
   (d) adjusting air flow within the air plenum based, at least in part, on the monitored temperature.

15. The thermal management method of claim 14, wherein (d) adjusting air flow within the air plenum comprises adjusting a rotation speed of the fan.

16. An electronic device including a processor and a power supply, wherein the power supply has an enclosure with a plurality of sides defining an air plenum, wherein at least one of the plurality of sides have openings disposed therein with a fan disposed within a first of the openings, the power supply including, along one side of the plurality of sides, an integrated passive heat removal device, wherein the processor of the electronic device is thermally coupled to an outside surface of the passive heat removal device such that heat generated by the processor is transferred into the air plenum for evacuation by the fan.

17. The electronic device of claim 16, wherein the fan is operative to increase air flow within the air plenum.

18. The electronic device of claim 16, further comprising an air flow control circuit, disposed within the power supply, operative to monitor air plenum temperature and adjust air flow within the air plenum based, at least in part, on the monitored air plenum temperature.

19. The electronic device of claim 18, wherein air flow within the air plenum is adjusted by adjusting a rotation speed of the fan.

* * * * *

UNITED STATES PATENT AND TRADEMARK OFFICE
CERTIFICATE OF CORRECTION

PATENT NO. : 5,926,367
DATED : July 20, 1999
INVENTOR(S) : Gutierrez et al.

It is certified that error appears in the above-identified patent and that said Letters Patent is hereby corrected as shown below:

Column 6,
Line 18, delete "714" and insert -- (not shown) --.

Signed and Sealed this

Fifth Day of August, 2003

JAMES E. ROGAN
*Director of the United States Patent and Trademark Office*